(12) United States Patent
Nowak et al.

(10) Patent No.: US 10,035,873 B2
(45) Date of Patent: Jul. 31, 2018

(54) RAPID CURING THIOL EPOXY RESIN WITH IMPROVED COMPRESSION STRENGTH PERFORMANCE

(71) Applicant: THE BOEING COMPANY, Chicago, IL (US)

(72) Inventors: Andrew Paul Nowak, Los Angeles, CA (US); April Rose Rodriguez, Marina Del Rey, CA (US); Thomas Ian Boundy, Arvada, CO (US); Carissa Ann Pajel, Redmond, WA (US); Alain A. Adjorlolo, Shoreline, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/449,093

(22) Filed: Mar. 3, 2017

(65) Prior Publication Data

US 2017/0174822 A1    Jun. 22, 2017

Related U.S. Application Data

(63) Continuation of application No. 14/931,518, filed on Nov. 3, 2015, now Pat. No. 9,611,375.

(51) Int. Cl.
| | | |
|---|---|---|
| *C08G 59/10* | (2006.01) | |
| *C08K 9/06* | (2006.01) | |
| *C08K 3/36* | (2006.01) | |
| *C08G 59/68* | (2006.01) | |

(52) U.S. Cl.
CPC ........... *C08G 59/10* (2013.01); *C08G 59/686* (2013.01); *C08K 3/36* (2013.01); *C08K 9/06* (2013.01)

(58) Field of Classification Search
None
See application file for complete search history.

(56) References Cited

U.S. PATENT DOCUMENTS

| | | | | |
|---|---|---|---|---|
| 3,505,166 A | | 4/1970 | Jones et al. | |
| 4,177,173 A | * | 12/1979 | Carr | C08G 59/68 252/182.17 |
| 4,383,090 A | * | 5/1983 | Slocki | C08G 59/46 252/182.17 |
| 4,696,992 A | * | 9/1987 | Goel | C08G 18/58 528/109 |
| 4,879,414 A | * | 11/1989 | Johnson | C07C 323/25 564/335 |
| 4,927,902 A | * | 5/1990 | Johnson | C07C 323/25 525/504 |
| 5,430,112 A | | 7/1995 | Sakata et al. | |
| 5,444,127 A | * | 8/1995 | Miskel, Jr. | C08G 59/686 525/504 |
| 8,846,170 B2 | | 9/2014 | Cruse et al. | |
| 2009/0264669 A1 | | 10/2009 | Upshaw | |
| 2010/0159238 A1 | | 6/2010 | Reyes, Jr. et al. | |
| 2011/0097568 A1 | | 4/2011 | Kamae et al. | |
| 2013/0181161 A1 | * | 7/2013 | Pajel | C08G 75/02 252/183.12 |
| 2013/0345372 A1 | * | 12/2013 | Blackford | C07D 303/22 525/535 |
| 2014/0272287 A1 | * | 9/2014 | Cai | C09K 3/1012 428/138 |

OTHER PUBLICATIONS

Petrie E. M., Abstract of Handbook of Adhesives and Sealants, 2nd Ed. McGraw Hill, New York, 2007.
Petrie E. M., Abstract of Epoxy Adhesive Formulations, McGraw Hill, New York, 2006.
N. V. Russavskaya et al., Russian Journal of General Chemistry, vol. 71, No. 11, 2001, pp. 1771-1772.
Extended European Search Report dated Mar. 15, 2017 for Application No./Patent No. 16197119.7-1308.

* cited by examiner

*Primary Examiner* — Megan McCulley
(74) *Attorney, Agent, or Firm* — Patterson + Sheridan, LLP

(57) ABSTRACT

Aspects described herein generally describe epoxy resins and methods of epoxy resin formation. In some embodiments, a resin includes the reaction product of one or more polythiols, one or more polyepoxides, one or more fillers and one or more amine catalysts. Polythiols have between two and about ten thiol moieties. Polyepoxides have between two and about ten epoxy moieties. One or more amine catalysts of the formula $NR_1R_2R_3$, wherein each of $R_1$, $R_2$, and $R_3$ is independently linear or branched C1-20 alkyl or two or more of $R_1$, $R_2$, and $R_3$ combine to form cycloalkyl. The resin has a compressive strength of at least 14 ksi at 2% offset at 70° F. and at least 8 ksi at 2% offset at 190° F.

22 Claims, 5 Drawing Sheets

RAPID CURING THIOL EPOXY RESIN WITH IMPROVED COMPRESSION STRENGTH PERFORMANCE

CROSS-REFERENCE TO RELATED APPLICATIONS

This application is a continuation of U.S. application Ser. No. 14/931,518 filed Nov. 3, 2015. The above-mentioned application is hereby incorporated by reference.

FIELD

Aspects described herein generally relate to epoxy-thiol resins and methods of curing epoxy-thiol resins.

BACKGROUND

Thermoset plastic/prepreg and liquid shim material are typically used in aerospace vehicle assembly to eliminate gaps and dimensional differences between two joined parts. Liquid shims are commonly epoxy-based structural adhesive materials that possess high compressive strengths. For gaps wider than ~3 millimeters, solid shims made out of thermoset plastic or prepreg are used, but in cases where gaps are less than ~3 millimeters or for wide area fit up, a flowable cured polymeric resin material (a liquid shim) is employed.

Key properties in a liquid shim material involve pot life, cure time, compressive strength, resistance to cyclic fatigue, and optimal rheology for convenient application to vehicle surfaces. Longer pot life allows the assembly of larger components and also aides in cleanup of unused material. Excessively long pot life, however, interferes with production throughput, as the shim typically needs time to reach the final cured state before assembly can continue. A limitation of state of the art liquid shims is the relationship between pot life and cure time resulting in shims with either impractically short working times or slow, inefficient cure times. Preferably, a liquid shim material will have a lengthy pot life combined with a rapid cure time for greatest manufacturing efficiency. In an ideal case, a user activated trigger would aid the transition between these two regimes. Heat may be used to achieve such an on/off transition. However, manufacturing of commercial aircraft involves strict limits on the degree of heating that can be applied during assembly processes (typically <140° F.). As a result, the cure transition must be developed to occur in a more narrow range than many heat activated systems.

Current state of the art epoxy resins (such as liquid shims) are amine epoxy based resins that meet the basic requirements for use as adhesives in aerospace vehicles. These resins show typical cure times of 8-9 hrs at ambient temp and 1.5-2 hrs at 140° F. while possessing a compressive strength of ≥8 ksi@2% offset at 190° F. Manufacturing flexibility with such compositions is limited due to the relationship between pot life and cure time. Accelerated cure times typically result in short, impractical pot lives while lengthy pot life compositions slow manufacturing efficiency. Furthermore, attempts at epoxy-thiol based resins thus far do not provide resins with adequate mechanical integrity (i.e., compressive strength) to achieve the performance of the current state of the art systems and meet modern aerospace materials standards.

Therefore, there is a need in the art for methods for forming resins and resins with adequate pot life, controllable curing times to form a resin, and mechanical properties that meet aerospace materials standards.

SUMMARY

Aspects described herein generally relate to epoxy resins and methods of curing epoxy resins.

In some examples, a resin includes the reaction product of one or more polythiols, one or more polyepoxides, one or more solid particulate fillers, and one or more amine catalysts. The one or more polythiols may have between two and about ten thiol moieties. The one or more polyepoxides have between two and about ten epoxy moieties. The one or more amine catalysts of the formula $NR_1R_2R_3$, wherein each of $R_1$, $R_2$, and $R_3$ is independently linear or branched C1-20 alkyl or two or more of $R_1$, $R_2$, and $R_3$ combine to form cycloalkyl. The resin has a compressive strength of at least 14 ksi at 2% offset at 70° F. and at least 8 ksi at 2% offset at 190° F.

In some examples, a vehicle component has a cured epoxy-thiol resin disposed thereon. The epoxy-thiol resin has a compressive strength of at least 14 ksi at 2% offset at 70° F. and at least 8 ksi at 2% offset at 190° F.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this present disclosure and are therefore not to be considered limiting of its scope, for the present disclosure may admit to other equally effective aspects.

To facilitate understanding, identical reference numerals have been used, where possible, to designate identical elements that are common to the figures. The figures are not drawn to scale and may be simplified for clarity. It is contemplated that elements and features of one aspect may be beneficially incorporated in other aspects without further recitation.

DETAILED DESCRIPTION

Figure 1:
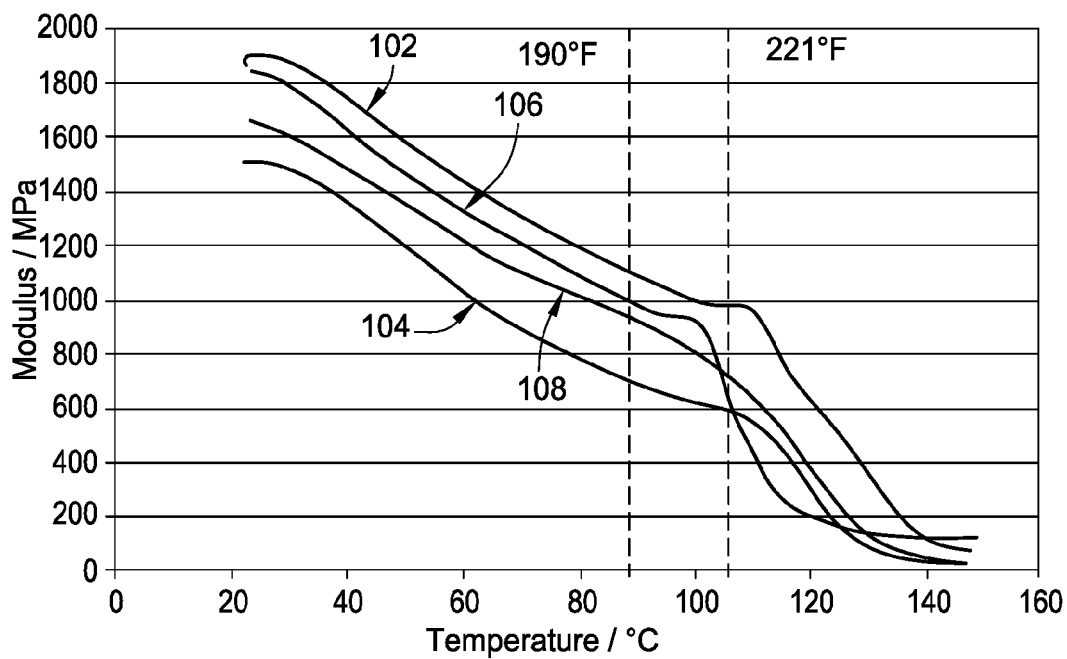
FIG. 1 illustrates glass transition of epoxy-thiol resins, according to an aspect of the disclosure.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

Aspects described herein generally describe epoxy resins and methods of epoxy resin formation. Epoxy-thiol resins described herein meet required aerospace material properties. In particular, epoxy-thiol resins described herein meet or exceed the compressive strength performance of the current state of the art epoxy-amine resins while also demonstrating a latent thermally triggered rapid curing behavior.

In some examples, a cured resin includes the reaction product of one or more polythiols, one or more polyepoxides, one or more solid particulate fillers, and one or more amine catalysts.

In some examples, a vehicle component has a cured epoxy-thiol resin disposed thereon. The epoxy-thiol resin has a compressive strength of at least 14 ksi at 2% offset at 70° F. and at least 8 ksi at 2% offset at 190° F.

In some examples, a resin includes one or more polythiols having between two and about ten thiol moieties. In some examples, at least one of the one or more polythiols is of the formula SH—R—SH. R may be selected from alkyl, cycloalkyl, thiol-substituted alkyl, and thiol-substituted cycloalkyl. The one or more polythiols may have an equivalent molecular weight of between about 30 to about 100. In some embodiments, each instance of the polythiol is independently 1,2,3-propanetrithiol, 1,2,4-tris(2-mercaptoethyl) cyclohexane, and 1,3,5-tris(2-mercaptoethyl) cyclohexane, and the like.

In some examples, the mixture includes one or more polyepoxides having between two and about ten epoxy moieties. Without being bound by theory, an epoxy moiety of the one or more polyepoxides interacts, for example as an electrophile, with a thiol moiety, as a nucleophile or hydrogen bond donor, of the one or more polythiols. In some examples, each instance of the one or more polyepoxides is independently N,N,N',N'-tetraglycidyl-4,4'-diaminodiphenylmethane (e.g., Araldite MY 721) and/or poly[(phenyl glycidyl ether)-codicyclopentadiene] (e.g., Tactix 556). In some examples, the molar ratio of polyepoxide to polythiol is between about 0.7 to about 0.99, such as about 0.8 to about 1.2, such as about 0.85 to about 0.95. In some examples, the molar ratio of polyepoxide to polythiol is about 0.90. Without being bound by theory, a subtle change in the molar ratio may affect reactivity and resin network formation, and ultimately affect compressive strength of a resin. In some examples, a desired compressive strength is achieved with a molar excess of polythiol.

In some examples, the mixture may include one or more solid particulate fillers. The identity and amount of one or more solid particulate fillers affects viscosity of a pre-cured resin for workability before curing. In some examples, each instance of the solid particulate filler is independently crystalline silica, fumed silica, methylated fumed silica, alumina, mica, silicates, talc, aluminosilicates, barium sulfate, diatomite, calcium carbonate, calcium sulfate, carbon, wollastonite, and the like. The one or more solid particulate fillers may be between about 10% wt to about 75% wt of the resin to yield a resin having a workable viscosity before curing. The one or more solid particulate fillers may be between about 50% wt to about 55% wt of the resin to yield a resin having a workable viscosity before curing. Crystalline silica may be 1-10 μm crystalline silica. Methylated fumed silica may be hexamethyldisilazane (HMDZ) modified fumed silica.

In some examples, the mixture includes one or more amine catalysts of the formula $NR_1R_2R_3$, wherein each of $R_1$, $R_2$, and $R_3$ is independently linear or branched C1-20 alkyl or two or more of $R_1$, $R_2$, and $R_3$ combine to form cycloalkyl. Without being bound by theory, the one or more amine catalysts promote deprotonation of thiol moieties of the one or more polythiols, which promotes nucleophilic attack of the one or more polythiols with electrophilic epoxy moieties of the one or more polyepoxides. Without being bound by theory, the greater the depotonating ability of the one or more amine catalysts and/or the greater the amount of the one or more amine catalysts in the mixture, the faster resin curing will occur (which will shorten pot life and cure time). The amount and identity of the one or more amine catalysts not only may affect pot life and cure time, but may also affect compressive strength of a resin. In some examples, $R_1$ and $R_2$ are each a shorter alkyl than an $R_3$ alkyl. In some examples, each instance of $R_1$ and $R_2$ is independently selected from C1-6 alkyl and $R_3$ is selected from C7-20 alkyl. In some examples, each instance of the one or more amine catalysts is independently selected from diisopropylethylamine, N-alkyl-piperidine, N-alkyl-piperazine, 1,4-diazabicyclo[2.2.2]octane, 1,8-diazabicyclo[5.4.0] undec-7-ene, trimethylamine, triethylamine, tripropylamine, N,N-dimethylethylamine, N,N-dimethylpropylamine, N,N-dimethylbutylamine, N,N-dimethylpentylamine, N,N-dimethylhexylamine, N,N-dimethylheptylamine, N,N-dimethyloctylamine, N,N-dimethylnonylamine, N,N-dimethyldecylamine, N,N-dimethylundecylamine, N,N-dimethyldodecylamine, N,N-dimethyltridecylamine, N,N-dimethyltetradecylamine, N,N-dimethylpentadecylamine, N,N-dimethylhexadecylamine, N,N-dimethylheptadecylamine, N,N-dimethyloctadecylamine, N,N-dimethylnonadecylamine, N,N-dimethyleicosylamine, N,N-diethylpropylamine, N,N-diethylbutylamine, N,N-diethylpentylamine, N,N-diethylhexylamine, N,N-diethylheptylamine, N,N-diethyloctylamine, N,N-diethylnonylamine, N,N-diethyldecylamine, N,N-diethylundecylamine, N,N-diethyldodecylamine, N,N-diethyltridecylamine, N,N-diethyltetradecylamine, N,N-diethylpentadecylamine, N,N-diethylhexadecylamine, N,N-diethylheptadecylamine, N,N-diethyloctadecylamine, N,N-diethylnonadecylamine, N,N-diethyleicosylamine, N,N-dipropylbutylamine, N,N-dipropylpentylamine, N,N-dipropylhexylamine, N,N-dipropylheptylamine, N,N-dipropyloctylamine, N,N-dipropylnonylamine, N,N-dipropyldecylamine, N,N-dipropylundecylamine, N,N-dipropyldodecylamine, N,N-dipropyltridecylamine, N,N-dipropyltetradecylamine, N,N-dipropylpentadecylamine, N,N-dipropylhexadecylamine, N,N-dipropylheptadecylamine, N,N-dipropyloctadecylamine, N,N-dipropylnonadecylamine, and N,N-dipropyleicosylamine.

In some examples, the one or more amine catalysts is N,N-dimethyltetradecylamine. The one or more amine catalysts may be a salt. Without being bound by theory, an amine catalyst that is a salt cures an epoxy-thiol resin more slowly than a neutral form of the amine catalyst, and may affect pot life, cure time, and/or compressive strength. The one or more amine catalysts may be between about 0.1% wt to about 10% wt of the resin. The one or more amine catalysts may be between about 1% wt to about 3% wt of the resin. The amount of the one or more amine catalysts may affect pot life, cure time, and/or compressive strength of a resin.

In some examples, the resin contains an adhesion promoter in order to increase interfacial adhesion strength between the adhesive and vehicle component. Adhesion promoter includes silane and alkoxy substituted silane. Adhesion promoters may be used to promote bonding of a vehicle component to a resin reactive group such as an epoxide, amine, or thiol.

In some examples, the resin has a compressive strength of at least 14 ksi at 2% offset at 70° F. and at least 8 ksi at 2% offset at 190° F., which meets required aerospace material properties.

In some examples, a method of forming a resin includes forming a resin composition by mixing one or more polythiols of the formula SH—R—SH, where R is alkyl, cycloalkyl, thiol-substituted alkyl, and thiol-substituted cycloalkyl with one or more polyepoxides having between two and about ten epoxy moieties, one or more solid particulate fillers, and one or more amine catalysts of the formula $NR_1R_2R_3$, wherein each of $R_1$, $R_2$, and $R_3$ is independently linear or branched C1-20 alkyl or two or more of $R_1$, $R_2$, and $R_3$ combine to form cycloalkyl. The method of forming a resin further includes applying the resin composition to a vehicle component surface, and curing the resin composition.

In some examples, curing the resin composition is performed at a temperature between about 70° F. and about 140° F. Methods may include forming the resin composition by mixing one or more polythiols, one or more polyepoxides, and one or more solid particulate fillers before adding the one or more amine catalysts to the mixture, which allows additional control of curing of the mixture. For example, curing of a mixture may be delayed until a final component, such as the one or more amine catalysts, one or more polythiols, and/or one or more polyepoxides, is included in the mixture. A delay in curing may allow for storage and/or transport of a mixture. Curing a resin may be performed at about 140° F. to achieve a shear modulus plateau within 30 minutes of curing. Curing a resin may be performed at about 70° F., where the resin composition has a pot life of between about 60 minutes to about 300 minutes, for example about 90 minutes.

As described herein, the term "alkyl" may include, but is not limited to, a linear or branched acyclic alkyl radical containing from 1 to about 20 carbon atoms. In some examples, alkyl is a C1-10alkyl, C1-7alkyl or C1-5 alkyl radical. Examples of alkyl include methyl, ethyl, propyl, isopropyl, butyl, isobutyl, tert-butyl, sec-butyl, and the like.

As described herein, the term "cycloalkyl" may include, but is not limited to, a monocyclic, bicyclic or tricyclic cyclized ring system of 3 to about 15 carbon atoms that is fully or partially saturated. Examples of cycloalkyl include cyclopentyl, cyclohexyl, cycloheptyl, and the like.

Many commercially available polythiol precursors possess large average distance (on a molecular scale) between thiol groups (i.e., large equivalent molecular weight per thiol moiety), often having equivalent molecular weight values of between 300 and 600. A large equivalent molecular weight of polythiol precursors provides greater flexibility in the resin network especially at high temperature. The greater flexibility compromises compressive strength. Polythiols of the present disclosure have smaller average distance between thiol groups (as compared to commercially available polythiol precursors) (i.e., small equivalent molecular weight per thiol moiety), which improves compressive strength of epoxy-thiol resins. In some examples, polythiols of the present disclosure have equivalent molecular weights of between about 5 to about 250, such as about 20 to about 115, such as about 30 to about 100.

EXAMPLE 1: RESIN 1

As shown in Table 1, Resin 1 contains 3.24 grams of Araldite MY 721, 1.08 grams of Tactix 556, 3.13 grams of 1,2,4-tris(2-mercaptoethyl)cyclohexane (TMC), 8.08 grams of micro silica, 0.32 grams of hexamethyldisilazane (HMDZ) modified fumed silica, and 0.15 g of N,N-dimethyltetradecylamine (DMTA). Resin 1 has a molar ratio of epoxy:thiol of about 92.5%.

TABLE 1

| | Resin 1: | |
|---|---|---|
| Component # | Component | Amount (g) |
| 1 | Araldite MY 721 | 3.24 |
| 2 | Tactix 556 | 1.08 |
| 3 | TMC | 3.13 |
| 4 | Crystalline Silica (51 wt %) | 8.08 |
| 5 | HMDZ Fumed Silica (2 wt %) | 0.32 |
| 6 | DMTA | 0.15 |

Araldite MY 721 is a polyepoxy of the formula:

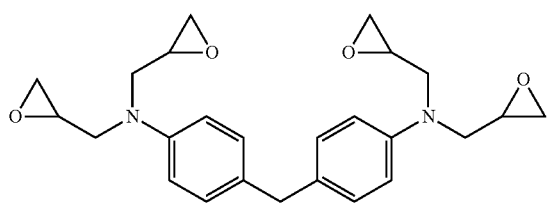 [SMILES: c1cc(N(CC2CO2)CC2CO2)ccc1Cc1ccc(N(CC2CO2)CC2CO2)cc1]

Tactix 556 is a polyepoxy of the formula:

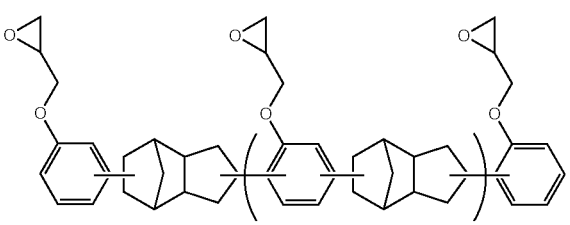

TMC is a polythiol of the formula:

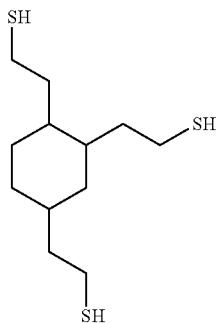 [SMILES: SCCC1CCC(CCS)C(CCS)C1]

DMTA is a tertiary amine of the formula:

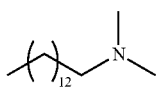

Resin 1 was prepared by mixing the appropriate amount of components 1-5 shown in Table 1. These components were mixed for 1 minute at 2300 rpm in a centrifugal mixer (DAC 600.1 FVZ, Flacktek) followed by hand mixing. The mixture was allowed to cool in room temperature water for 30 minutes before adding component 6 and mixing at 2300 rpm for an additional 15 seconds. This mixed resin sample was cured at 75° F.±5° F. for 14 days and was tested for compressive strength according to ASTM 695. For elevated temperature testing, samples and compression platens were held at 88° C. (190° F.) for ten minutes longer than it took for the platens to thermally equilibrate within the thermal chamber.

In some examples, a difference in the molar ratio of polythiol to polyepoxy compounds of the starting compositions of a first resin and a second resin results in different compressive strengths of the two resins. A ratio of polythiol to polyepoxy compounds of the starting composition of a resin may deviate from the typical 1:1 molar ratio. Without being bound by theory, a subtle change in the molar ratio may affect reactivity and resin network formation. Compressive strength deviation of two or more resins by adjusting the ratio of polythiol to polyepoxy compounds may be monitored by the glass transition temperature of a cured resin.

For example, the stoichiometric composition in epoxy-thiol Resin 1 was monitored through Dynamic Mechanical Analysis (DMA, TA Q800). For a given amount of thiol, the molar ratio based on epoxy to thiol compound was screened in 5% increments where it was found that the glass transition (Tg) for resin 1 upon heating at 3° C./min was optimized at about 90% epoxy to thiol compounds (line 102), as shown in FIG. 1. As shown in FIG. 1, storage modulus (MegaPascals (MPa)) as a function of temperature for Resin 1 was lowest across a wide range of temperatures (room temperature to 221° F.) where the ratio of polyepoxy to polythiol compounds was 1:1 (i.e., 100% epoxy) (line 104). As described herein, "room temperature" is defined as a temperature between about 65° F. to about 80° F., such as about 70° F. Storage modulus at a given temperature of 85% epoxy (line 106) and 95% epoxy (line 108) is each lower than 90% epoxy (line 102).

Figure 2:
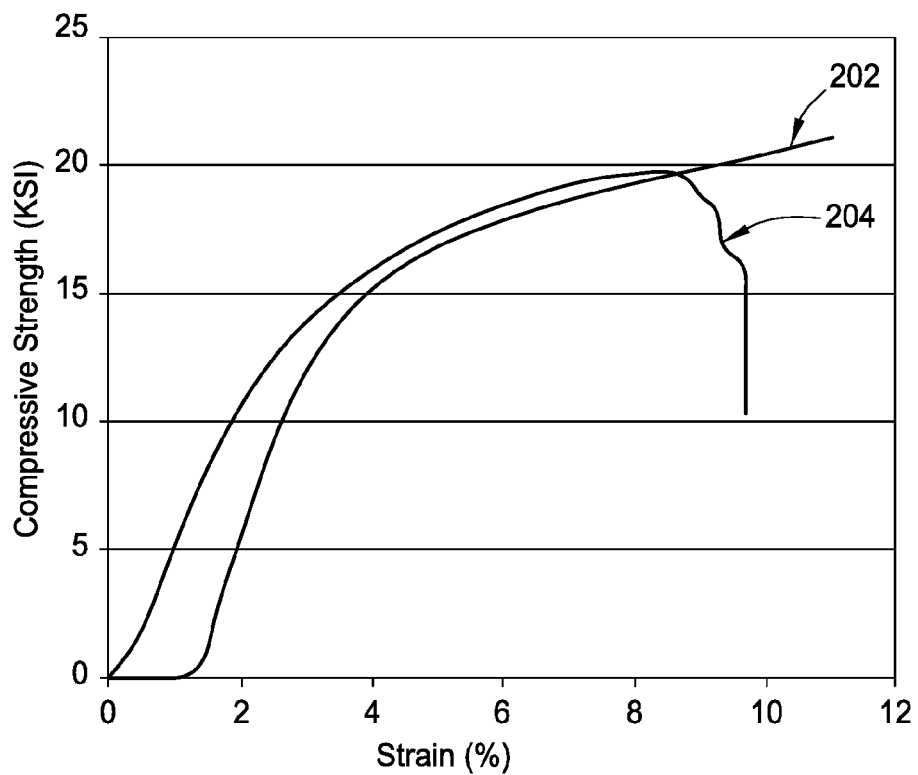
FIG. 2 illustrates compressive strength at room temperature of 92.5% epoxy-thiol resin and EA9377 epoxy-amine, according to an aspect of the disclosure.

Using the 90% epoxy/thiol ratio (line 102) of Resin 1, compressive strength samples were prepared and aged for two weeks at room temperature before testing. As shown in FIG. 2, Resin 1 (90% epoxy/thiol) (line 202) has a compressive strength of 17.2 ksi at room temperature. These results indicate how Resin 1 (90% epoxy/thiol) is comparable in compressive strength at 2% offset compared to the EA9377 epoxy-amine benchmark resin (line 204).

Figure 3:
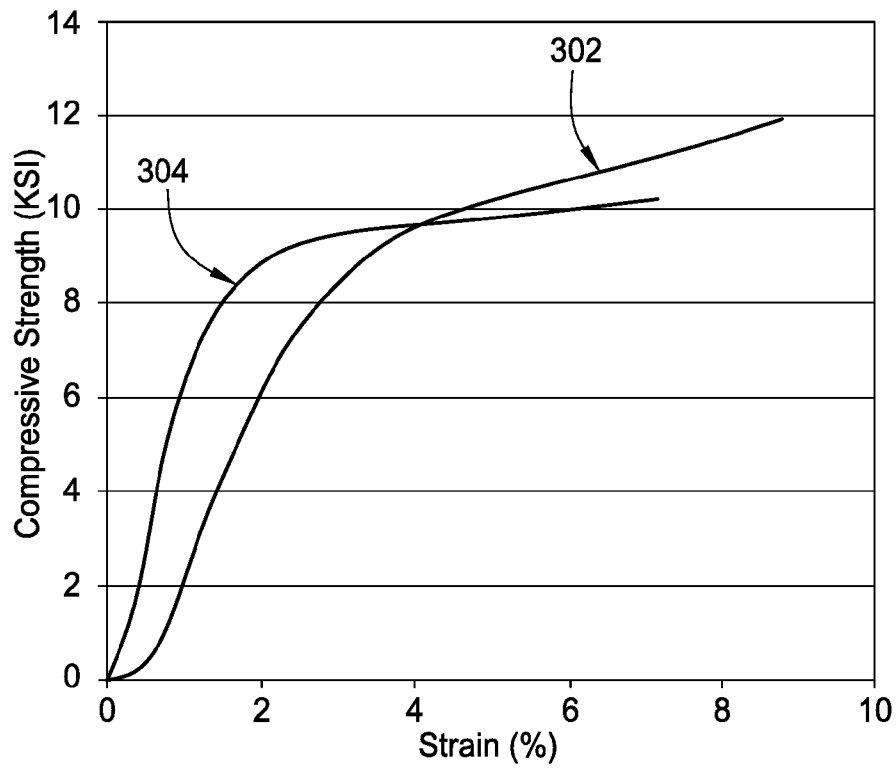
FIG. 3 illustrates compressive strength at elevated temperature of 92.5% epoxy-thiol resin and EA9377 epoxy-amine, according to an aspect of the disclosure.

For compressive strength at elevated temperatures, a compressive strength sample of the 90% epoxy/thiol ratio of Resin 1 was prepared and aged for two weeks at room temperature, followed by placing the sample in a thermal chamber for compressive strength testing. The chamber was left to equilibrate at 190° F. and then a 10 min soak was applied after equilibration before initiating the compression testing. As shown in FIG. 3, Resin 1 (90% epoxy) (line 302) has a compressive strength of 9.8 ksi and 432 ksi modulus at 190° F. Resin 1 (90% epoxy) indeed outperforms epoxy-amine EA9377 (line 304), indicating the benefit of tighter crosslinking density in the epoxy-thiol system which improves compressive strength performance.

Figure 4:
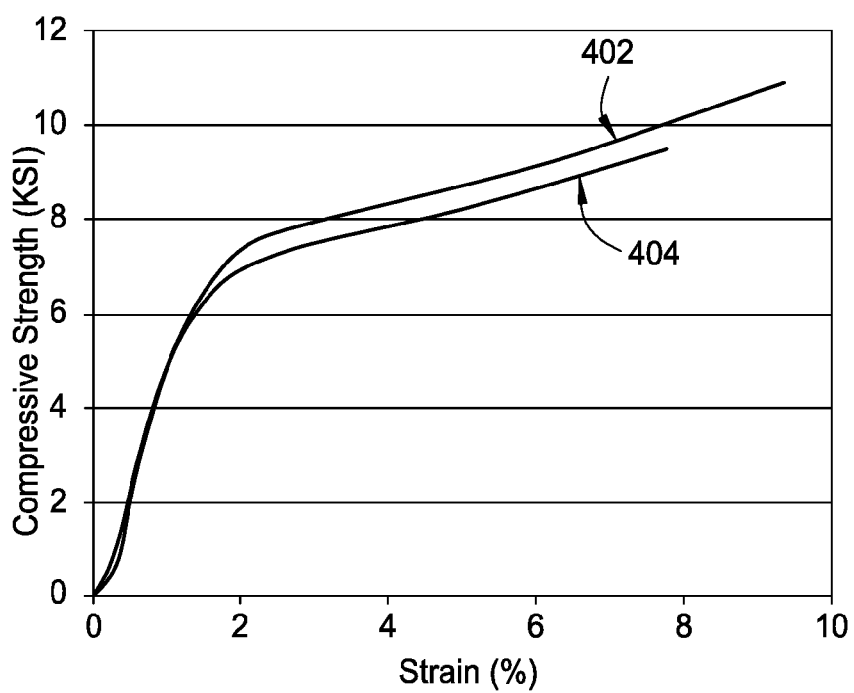
FIG. 4 illustrates effect of soak time at 220° F. of 92.5% epoxy-thiol resin, according to an aspect of the disclosure.

Given the higher compressive strength performance at 190° F. of Resin 1 (90% epoxy), additional testing was performed at 221° F. (105° C.) where differing soak times were compared. For the resins of FIG. 3, compressive strength testing utilized a method of bringing the thermal chamber and sample up to temperature (190° F.) and then holding for approximately 10 mins following equilibration. The potential for higher performance due to a higher degree of curing or network crosslinking was investigated by extending the soak time to approximately 240 mins before compressing. As shown in FIG. 4, an increase in compressive strength is observed for Resin 1 (90% epoxy) with soak time to approximately 240 mins (line 402) as compared to Resin 1 (90% epoxy) that was heated to 190° F. and held at approximately 10 mins following equilibration (line 404).

EXAMPLE 2: RESIN 2: POT LIFE AND CURE TIME

Figure 5:
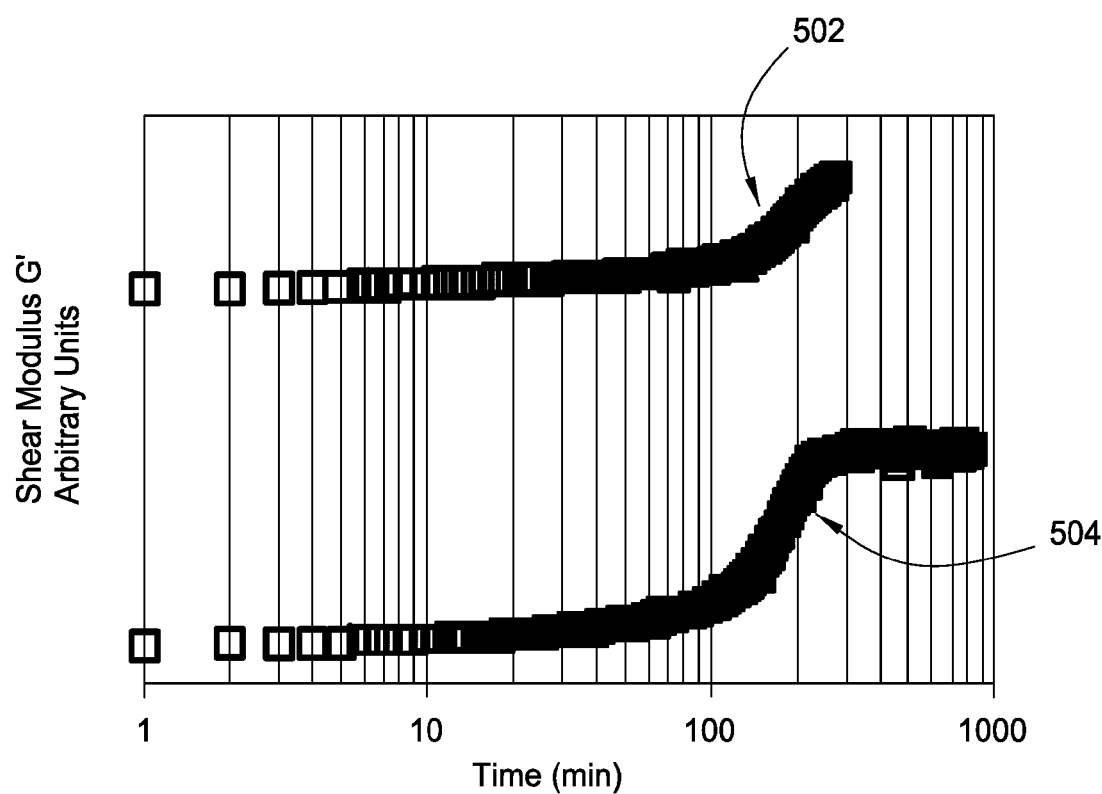
FIG. 5 illustrates pot life of an epoxy-thiol resin and EA9377 epoxy-amine, according to an aspect of the disclosure.

Following the general procedure for preparation of Resin 1, Resin 2 was prepared with the same composition as Resin 1, except 2% (w/w) of a salt form of 1,8-diazabicyclo[5.4.0] undec-7-ene (DBU) was used instead of neutral DMTA. Both salt forms and neutral forms of tertiary amines, such as DBU and DMTA, impart latent cure properties to pre-cured epoxy-thiol resins, which allows longer working life at room temperature but faster kinetics at elevated temps (140° F.). In order to determine workable pot-life of Resin 2, the shear modulus (G') was monitored at 25° C. As shown in FIG. 5, Resin 2 (line 502) experiences minimal thickening up to about 100 minutes, demonstrating an acceptable working life, as compared to epoxy-amine EA9377 resin (line 504).

Figure 6:
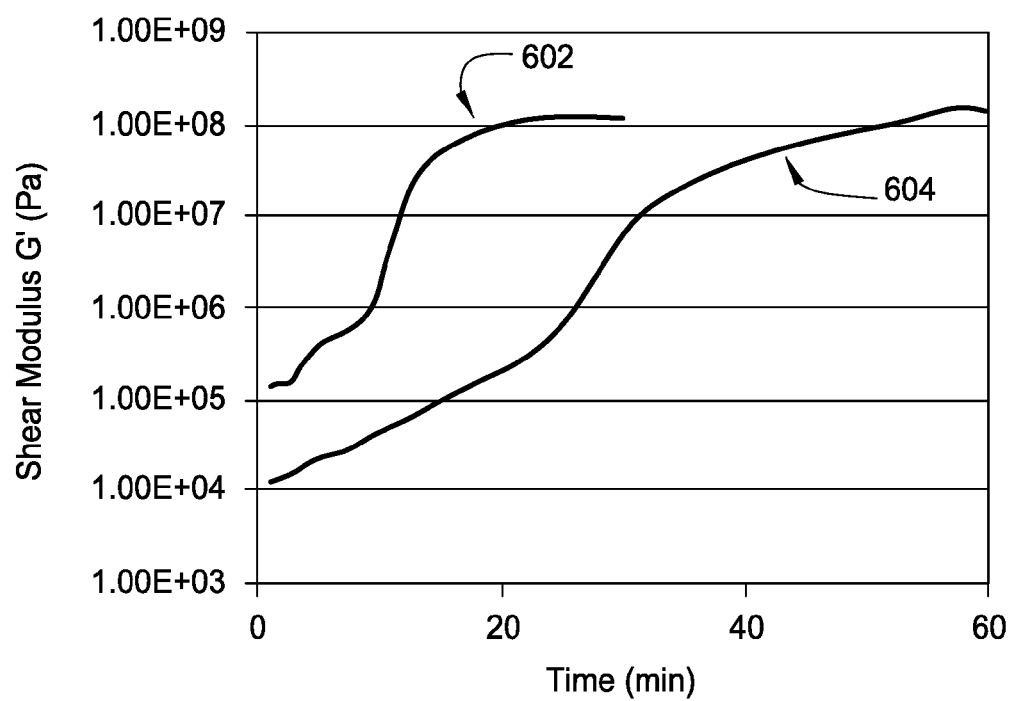
FIG. 6 illustrates cure kinetics at elevated temperature of an epoxy-thiol resin and EA9377 epoxy-amine, according to an aspect of the disclosure.

Demonstration of cure kinetics with elevated temperature curing at 140° F. of Resin 2 was also evaluated by measuring shear modulus (G') versus time and comparing the modulus rise of epoxy-amine EA9377. As shown in FIG. 6, Resin 2 (line 602) was able to achieve a modulus plateau well within 30 minutes at 140° F. while epoxy-amine EA9377 resin (line 604) reached its plateau in 60 minutes at 140° F. or beyond. Therefore, Resin 2 may be cured at about 140° F. to acceptable hardness within about 30-minutes, unlike an epoxy-amine EA9377 resin.

Figure 7:
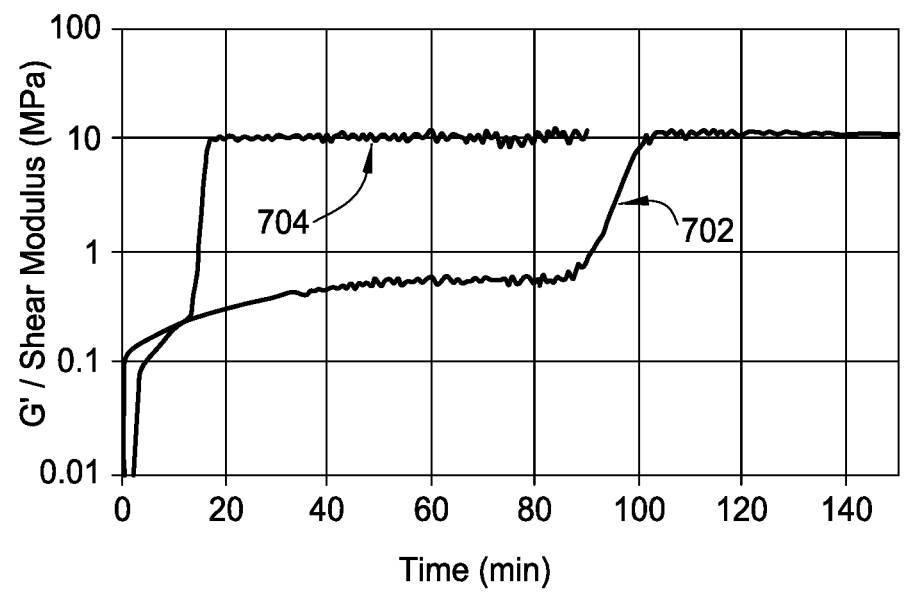
FIG. 7 illustrates the effect of increased temperature on pot life and shear modulus, according to an aspect of the disclosure.

In some examples, a slower cure may be favored to increase work time of a liquid shim. As shown in FIG. 7, Resin 1 (90% epoxy-thiol) (line 702) gives an accelerated cure of less than 20 mins at 140° F. Nonetheless, an ambient cure (room temperature) of Resin 1 (line 702) has a pot life of about 90 min in addition to a sharp cure transition to the same shear modulus as that observed for the accelerated cure. An increased cure time/pot life may also be achieved by cooling the composition of pre-cured Resin 1. In some examples, pre-cured Resin 1 may be cooled to between about −200° F. to about 32° F., such as about −100° F. to about −50° F. Cooling pre-cured Resin 1 allows for transportation of the composition before application as a resin. Alternatively, pre-cured epoxy-thiol composition may be transported without an amine catalyst, and the amine catalyst may be introduced to the composition to initiate curing. For example, a composition of components 1 through 5 of Resin 1 may be transported. Just before resin formation, component 6 (e.g., a tertiary amine) is added to the composition to initiate curing and formation of Resin 1.

EXAMPLE 3: RESIN 3

Following the general procedure for preparation of Resin 1, Resin 3 was prepared with the same composition (as shown in Table 2) as Resin 1, except Tactix 556 was not used and the amount of TMC was increased to give a 1:0.925 molar ratio of Araldite MY 721 to TMC.

TABLE 2

| | Resin 3: | |
|---|---|---|
| Component # | Component | Amount (g) |
| 1 | Araldite MY 721 | 3.00 |
| 2 | TMC | 2.47 |
| 3 | Crystalline Silica (1-10 μm powder) | 6.19 |
| 4 | HMDZ Fumed Silica | 0.24 |
| 5 | DMTA | 0.24 |

Figure 8A:
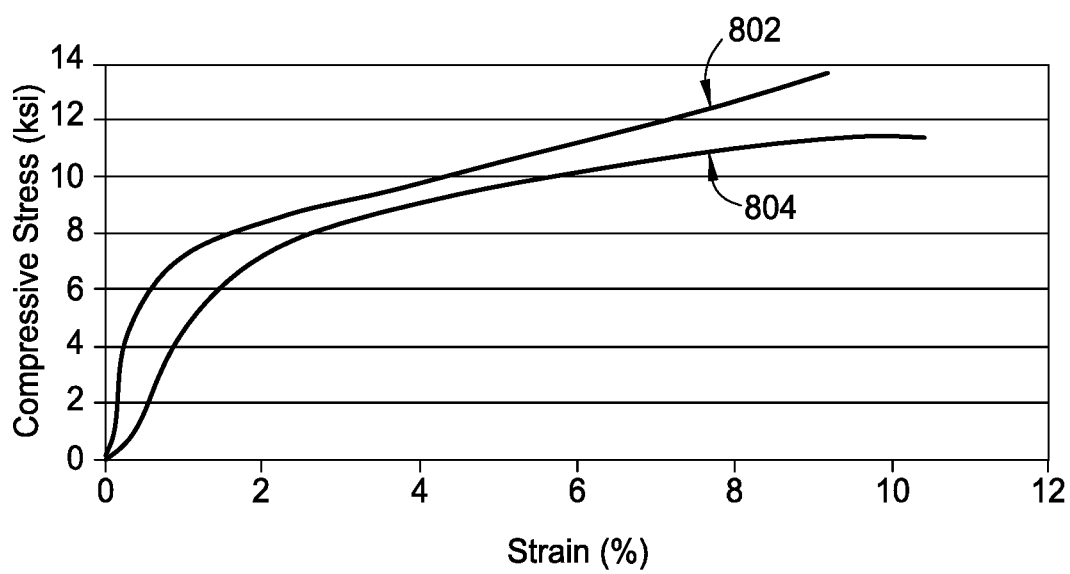
FIG. 8a illustrates compressive strength at elevated temperature of an epoxy-thiol resin and EA9377 epoxy-amine, according to an aspect of the disclosure.

Resin 3 and epoxy-amine EA9377 resin were each formed by a cure at 140° F. for 240 mins. As shown in FIG. 8a, Resin 3 (line 802) has a compressive stress of about 8.7 ksi at 2% offset at 190° F. Resin 3, therefore, has a higher compressive stress than epoxy-amine EA9377 resin (line 804) at 190° F.

Figure 8B:
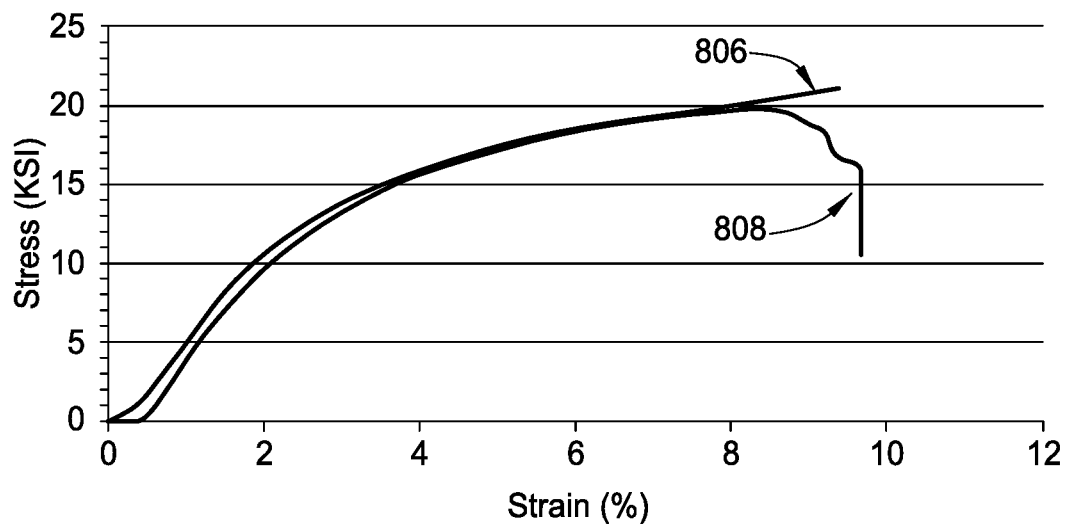
FIG. 8b illustrates compressive strength at room temperature of an epoxy-thiol resin and EA9377 epoxy-amine, according to an aspect of the disclosure.

As shown in FIG. 8b, Resin 3 (line 806) has a compressive stress of about 16.3 ksi at 2% offset at room temperature. Resin 3, therefore, has a comparable compressive stress as epoxy-amine EA9377 resin (line 808) at room temperature.

Comparative Example: Resin 1 vs. Resin 4

The composition of Resin 1 is as described for Example 1 in Table 1 (above). Following the general procedure for preparation of Resin 1, Resin 4 (as shown in Table 3) was prepared with the same composition as Resin 1, except Epon 828 was used instead of both Araldite MY 721 and Tactix 556, and DMP-30 was used instead of DMTA.

TABLE 3

| | Resin 4: | |
|---|---|---|
| Component # | Component | Amount (g) |
| 1 | Epon 828 | 3.24 |
| 2 | TMC | 1.08 |
| 3 | Micro Silica (51 wt %) | 8.08 |
| 4 | HMDZ Fumed Silica (2 wt %) | 0.32 |
| 5 | DMP-30 | 0.1 |

Epon 828 is a polyepoxy compound of the formula:

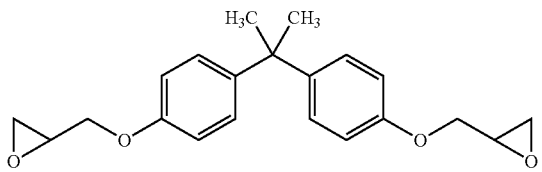 [SMILES: CC(C)(c1ccc(OCC2CO2)cc1)c1ccc(OCC2CO2)cc1]

DMP-30 is a tertiary amine of the formula:

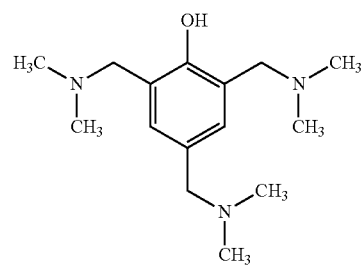

Figure 9:
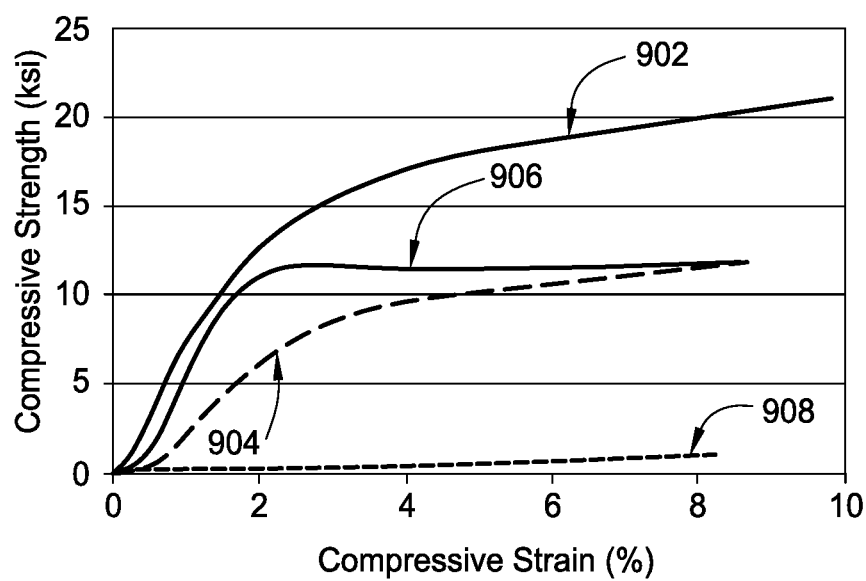
FIG. 9 illustrates compressive strength of a 92.5% epoxy-thiol resin and an epoxy-thiol resin, according to an aspect of the disclosure.

As shown in FIG. 9, Resin 1 has higher compressive strength than Resin 4 at both room temperature compression (line 902) and 190° F. compression (line 904). Compressive strength of Resin 4 at room temperature compression is shown at line 906. Resin 4 does not demonstrate any reasonable compressive strength performance at elevated temperature (190° F.) as shown at line 908.

Epoxy-thiol resins described herein may be pre-mixed and prepared on a vehicle component for use as a film-adhesive, for example, in cases where gaps are narrower than about 3 millimeters. Vehicle components include aircraft components, automobile components, marine components, and the like. After the filming process, the epoxy-thiol material may be frozen to arrest cure progression until the time of installation. Pre-mixed epoxy-thiol resins may be applied onto coated or uncoated aircraft components such as panels, coated lap joints between two or more panels, wing-to-fuselage assemblies, and structural aircraft composite or metallic part; e.g., fuselage body-joint or wing rib-to-skin joint. The pre-mixed epoxy-thiol resins are typically prepared by mixing a polyepoxy compound, a polythiol compound, a filler material, and a tertiary amine and thereafter applying the resultant composition(s) onto a vehicle component. The term, "applying" includes any deposition method (for example, dipping, coating, spraying, etc.). The pre-cured epoxy-thiol resins disclosed herein possess favorable reaction kinetics for preparing sheets having one or more cured resin layers with compressive strength of at least 14 ksi at 2% offset room temperature and at least 8 ksi at 2% offset at 190° F.

Epoxy-thiol resins described herein may also be used as a component of prepreg materials, for example, in cases where gaps are wider than about 3 millimeters. For example, epoxy-thiol resins described herein may be impregnated into fiber materials composed of graphite, fiberglass, nylon, Kevlar® and related materials (for example, other aramid polymers), spectra, among others.

Epoxy-thiol resins described herein have compressive strength equivalent to or exceeding current state of the art epoxy-amine resins. Without being bound by theory, compressive strength of epoxy-thiol resins described herein are likely due to, for example, (1) low average distance between reactive thiol moieties in the polythiol precursor which increases crosslinking density, and (2) how the ratio of epoxy to thiol reactive groups affects compressive strength.

Pre-cured epoxy-thiol resins described herein have a thiol to epoxy ratio that produces resins with high compressive strengths at both room temperature and elevated temperature (for example, from about 190° F. to about 221° F.). Epoxy-thiol resins described herein have a compressive strength of about 14 ksi or greater at 2% offset at room temperature. Epoxy-thiol resins described herein have a compressive strength of about 8 ksi or greater at 2% offset at 190° F. Pre-cured epoxy-thiol resins described herein are rapidly cured at elevated temperature (e.g., 15 mins or less at 140° F.), have a pot life of about 90 minutes or more, and have room temperature cure of about 2.5 hours or less. Pre-cured epoxy-thiol resins described herein allow for a composition that is dormant in the uncatalyzed state (e.g., in the absence of a tertiary amine) but capable of being catalyzed to accelerate curing. In addition, the mechanical properties of epoxy-thiol resins described herein have compressive strength that meets or exceeds that of the current state of the art epoxy-amine liquid shims. Epoxy-thiol resins described herein are superior to epoxy-amine resins for thin film applications such as moldable plastic shims because the pre-cured epoxy-thiol resins are less susceptible to reactions with atmospheric moisture and carbon dioxide.

While the foregoing is directed to aspects of the present disclosure, other and further aspects of the present disclosure may be devised without departing from the basic scope thereof. Furthermore, while the foregoing is directed to epoxy-thiol resins as applied to the aerospace industry, aspects of the present disclosure may be directed to other applications not associated with an aircraft, such as applications in the automotive, marine, energy industry, and the like.

What is claimed is:

1. A resin that is the reaction product of:
   one or more polythiols having between two and about ten thiol moieties;
   one or more polyepoxides having between two and about ten epoxy moieties at a molar ratio of polyepoxides to polythiols of about 0.9; and
   one or more amine catalysts of the formula $NR_1R_2R_3$, wherein each of $R_1$, $R_2$, and $R_3$ is independently linear or branched C1-20 alkyl or two or more of $R_1$, $R_2$, and $R_3$ combine to form cycloalkyl.

2. The resin of claim 1, wherein the resin has a compressive strength of at least 14 ksi at 2% offset at 70° F. and at least 8 ksi at 2% offset at 190° F.

3. The resin of claim 1, further comprising one or more solid particulate fillers.

4. The resin of claim 3, wherein the one or more solid particulate fillers is between about 50% wt to about 55% wt of the resin.

5. The resin of claim 1, wherein at least one of the one or more polythiols is of the formula SH—R—SH, wherein R is selected from the group consisting of alkyl, cycloalkyl, thiol-substituted alkyl, and thiol-substituted cycloalkyl.

6. The resin of claim 1, wherein each instance of the polythiol is independently selected from the group consisting of 1,2,3-propanetrithiol, 1,2,4-tris(2-mercaptoethyl) cyclohexane, and 1,3,5-tris(2-mercaptoethyl) cyclohexane.

7. The resin of claim 1, wherein each instance of the solid particulate fillers is independently selected from the group consisting of crystalline silica, fumed silica, methylated fumed silica, alumina, mica, silicate, talc, aluminosilicate, barium sulfate, diatomite, calcium carbonate, calcium sulfate, carbon, and wollastonite.

8. The resin of claim 1, wherein each instance of the one or more amine catalysts is independently selected from the group consisting of diisopropylethylamine, N-alkyl-piperidine, N-alkyl-piperazine, 1,4-diazabicyclo[2.2.2]octane, 1,8-diazabicyclo[5.4.0]undec-7-ene, trimethylamine, triethylamine, tripropylamine, N,N-dimethylethylamine, N,N-dimethylpropylamine, N,N-dimethylbutylamine, N,N-dimethylpentylamine, N,N-dimethylhexylamine, N,N-dimethylheptylamine, N,N-dimethyloctylamine, N,N-dimethylnonylamine, N,N-dimethyldecylamine, N,N-dimethylundecylamine, N,N-dimethyldodecylamine, N,N-dimethyltridecylamine, N,N-dimethyltetradecylamine, N,N-dimethylpentadecylamine, N,N-dim ethylhexadecylamine, N,N-dimethylheptadecylamine, N,N-dimethyloctadecylamine, N,N-dimethylnonadecylamine, N,N-dimethyleicosylamine, N,N-diethylpropylamine, N,N-diethylbutylamine, N,N-diethylpentylamine, N,N-diethylhexylamine, N,N-diethylheptylamine, N,N-diethyloctylamine, N,N-diethylnonylamine, N,N-diethyldecylamine, N,N-diethylundecylamine, N,N-diethyldodecylamine, N,N-diethyltridecylamine, N,N-diethyltetradecylamine, N,N-diethylpentadecylamine, N,N-diethylhexadecylamine, N,N-diethylheptadecylamine, N,N-diethyloctadecylamine, N, N-diethylnonadecylamine, N,N-diethyleicosylamine, N,N-dipropylbutylamine, N,N-dipropylpentylamine, N,N-dipropylhexylamine, N,N-dipropylheptylamine, N,N-dipropyloctylamine, N,N-dipropylnonylamine, N,N-dipropyldecylamine, N,N-dipropylundecylamine, N,N-dipropyldodecylamine, N,N-dipropyltridecylamine, N,N-dipropyltetradecylamine, N,N-dipropylpentadecylamine, N,N-dipropylhexadecylamine, N,N-dipropylheptadecylamine, N,N-dipropyloctadecylamine, N,N-dipropylnonadecylamine, and N,N-dipropyleicosylamine.

9. The resin of claim 8, wherein the one or more amine catalysts is N,N-dimethyltetradecylamine.

10. The resin of claim 1, wherein the one or more amine catalysts is a salt.

11. The resin of claim 1, wherein the one or more amine catalysts is between about 0.1% wt to about 10% wt of the resin.

12. The resin of claim 1, wherein the one or more amine catalysts is between about 1% wt to about 3% wt of the resin.

13. The resin of claim 1, wherein at least one of the one or more polyepoxides has between four and about ten epoxy moieties.

14. The resin of claim 1, wherein each instance of the one or more polyepoxides is independently selected from the group consisting of N,N,N',N'-tetraglycidyl-4,4'-diaminodiphenylmethane, poly[(phenyl glycidyl ether)-codicyclopentadiene], tetraphenylolethane glycidyl ether, and tris(4-hydroxyphenyl)methane triglycidyl ether.

15. The resin of claim 14, wherein at least one of the one or more polyepoxides is tetraphenylolethane glycidyl ether or tris(4-hydroxyphenyl)methane triglycidyl ether.

16. The resin of claim 14, wherein the one or more amine catalysts is N,N-dimethyltetradecylamine.

17. A resin that is the reaction product of:
   a polythiol having an equivalent molecular weight of between about 20 to about 115; and
   a polyepoxide having between four and about ten epoxy moieties;
   a solid particulate filler;
   wherein the resin has a compressive strength of at least 14 ksi at 2% offset at 70° F. and at least 8 ksi at 2% offset at 190° F.

18. The resin of claim 17, wherein the molar ratio of polyepoxide to polythiol is about 0.9.

19. The resin of claim 17, wherein the polythiol is 1,2,4-tris(2-mercaptoethyl)cyclohexane and the polyepoxide is of the formula:

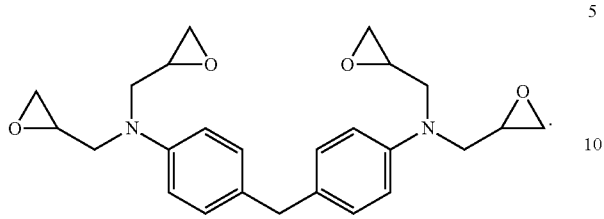

20. A composition comprising:
one or more polythiols having between two and about ten thiol moieties; and
one or more polyepoxides having between two and about ten epoxy moieties at a molar ratio of polyepoxides to polythiols of about 0.9.

21. The composition of claim 20, further comprising a solid particulate filler.

22. The composition of claim 21, further comprising an amine catalyst.

* * * * *

UNITED STATES PATENT AND TRADEMARK OFFICE
CERTIFICATE OF CORRECTION

PATENT NO. : 10,035,873 B2
APPLICATION NO. : 15/449093
DATED : July 31, 2018
INVENTOR(S) : Andrew Paul Nowak et al.

Page 1 of 1

It is certified that error appears in the above-identified patent and that said Letters Patent is hereby corrected as shown below:

In the Claims

In Column 11, Lines 60-61, in Claim 6, delete ") cyclohexane," and insert -- )cyclohexane, --, therefor.

In Column 11, Line 61, in Claim 6, delete ") cyclohexane." and insert -- )cyclohexane. --, therefor.

In Column 12, Line 13, in Claim 8, delete "dim ethylhexadecylamine," and insert -- dimethylhexadecylamine, --, therefor.

In Column 12, Line 23, in Claim 8, delete "N, N-" and insert -- N,N- --, therefor.

Signed and Sealed this
Twentieth Day of August, 2019

Andrei Iancu
*Director of the United States Patent and Trademark Office*